United States Patent [19]

Jung

[11] Patent Number: 5,720,179
[45] Date of Patent: Feb. 24, 1998

[54] METHODS AND APPARATUS FOR CONTROLLING THE TEMPERATURES OF A PLURALITY OF ROOMS

[75] Inventor: Nack-Hun Jung, Suwon, Rep. of Korea

[73] Assignee: Samsung Electronics Co., Ltd., Suwon, Rep. of Korea

[21] Appl. No.: 537,286

[22] Filed: Sep. 27, 1995

[30] Foreign Application Priority Data

Sep. 27, 1994 [KR] Rep. of Korea ............... 94-24339

[51] Int. Cl.⁶ .................. F25B 13/00; F25B 1/00
[52] U.S. Cl. .............. 62/160; 62/324.6; 165/207; 165/265
[58] Field of Search ............... 62/160, 324.6, 62/228.4; 165/207, 208, 265

[56] References Cited

U.S. PATENT DOCUMENTS

| | | |
|---|---|---|
| 4,878,357 | 11/1989 | Sekigami et al. ............ 62/160 |
| 5,483,805 | 1/1996 | Fujii et al. ............ 62/161 X |

*Primary Examiner*—William E. Wayner
*Attorney, Agent, or Firm*—Burns, Doane, Swecker & Mathis, L.L.P.

[57] ABSTRACT

The temperatures of a plurality of rooms are controlled by a refrigerant cycle which enables a user to select desired room temperatures and one of the following operating modes: (i) supplying hot refrigerant to the indoor heat exchangers of all rooms, (ii) supplying cold refrigerant to the indoor heat exchangers of all rooms, and (iii) supplying hot refrigerant to an indoor heat exchanger of one room and cold refrigerant to an indoor heat exchanger of another room.

4 Claims, 12 Drawing Sheets

METHODS AND APPARATUS FOR CONTROLLING THE TEMPERATURES OF A PLURALITY OF ROOMS

BACKGROUND OF THE INVENTION

1. Field of the Invention

The present invention relates to a control apparatus of an air conditioner and a method thereof for simultaneously cooling and heating a plurality of room spaces, or individually and separately heating and cooling room spaces by utilizing one outdoor unit.

2. Description of the Prior Art

Generally, an air conditioner comes in two types, i.e., one is a heating apparatus for heating cold air in a room and the other is a cooling apparatus for cooling warm air in the room.

Of course, there is an apparatus having dual functions of heating and cooling the room, and in addition an air-cleaning function for cleaning polluted indoor air.

Referring to FIG. 1, there is illustrated a conventional air conditioner of a cooling-only apparatus.

As shown in FIG. 1, when refrigerant compressed by a compressor 1 to a gaseous state at high temperature and high pressure is infused to an outdoor heat exchanger 2, the outdoor heat exchanger 2 serves to heat-exchange the same with air blown by an outdoor fan (not shown), and forcibly cool and liquify the refrigerant.

The fluid refrigerant of low temperature and high pressure liquefied at the outdoor heat exchanger 2 passes through an expansion valve 3 for expanding the refrigerant to an evaporating pressure, reduced in pressure to become atomized refrigerant of low pressure and low temperature and is infused to an indoor heat exchanger 4.

Accordingly, the atomized refrigerant reduced to low pressure and low temperature at the expansion valve 3 is evaporated in the course of passing through various pipes and takes heat from the air blown by an indoor fan (not shown) in the course of being gasified, to thereby cool the air in a room.

The cooled air is in turn discharged indoors to thereby perform a cooling operation. The gaseous refrigerant of low pressure and low temperature cooled at the indoor heat exchanger 4 is in turn fed into the compressor 1 and circulates repeatedly through a cooling loop as illustrated by continuous line arrows in FIG. 1.

However, there is a problem in the conventional air conditioner for performing the cooling operation according to the cooling cycle thus described, in that various rooms cannot be simultaneously cooled because the outdoor unit controls only one indoor unit, and an indoor heating operation cannot be performed.

By way of another prior art utilizing an air conditioner for performing dual operations of cooling or heating a room (see FIG. 2), when refrigerant compressed to a gaseous state of high temperature and high pressure at the compressor is infused into the outdoor heat exchanger 2 according to the control of a four-way valve 5, as illustrated in FIG. 2, the outdoor-heat exchanger 2 serves to forcibly cool and liquify the gaseous refrigerant.

The fluid refrigerant of low temperature and high pressure liquefied by the outdoor heat exchanger 2 passes through the expansion valve 3 via one way valve 7 to thereby be reduced to atomized refrigerant of low pressure and low temperature which is infused into the indoor heat exchanger 4.

Accordingly, the atomized refrigerant in the indoor heat exchanger 4 takes the heat from the air blown by the indoor fan to thereby cool the air in the room when the atomized refrigerant passes through various pipes and is vaporized and is finally gasified. The cooled air is discharged indoors to thereby perform the cooling operation. The gasified refrigerant of low pressure and low temperature cooled by the indoor heat exchanger 4 is in turn fed into the compressor 1 and circulates repeatedly through a cooling loop as illustrated by solid line arrows in FIG. 2, thereby performing the indoor cooling operation.

Meanwhile, in case of heating, when the refrigerant compressed to gaseous state of high pressure and high temperature by the compressor 1 is infused into the indoor heat exchanger 4 according to the control of the four way valve 5, the indoor heat exchanger 4 serves to heat-exchange the air blown by the indoor fan, to thereby cool the refrigerant to room temperature and high pressure. Thus, the heated air is discharged indoors to perform the heating operation.

The refrigerant liquefied by the indoor heat exchanger 4 is reduced to refrigerant of low temperature and low pressure by the expansion valve 3 and an expansion valve 6 and is then infused into the outdoor heat exchanger 2.

Accordingly, the outdoor heat exchanger 2 serves to heat-exchange the refrigerant reduced in pressure at the expansion valve 3 and the expansion valve 6 by way of the air blown by the outdoor fan, thereby cooling the refrigerant.

The gasified refrigerant of low temperature and low pressure cooled by the outdoor heat exchanger 2 is in turn fed into the compressor 1 and circulates repeatedly through a heating loop as illustrated by dotted line arrows in FIG. 2, thereby performing an indoor heating operation.

However, there is a problem in the air conditioner depicted in FIG. 2 in that heating cannot be performed during the cooling operation, and cooling cannot be performed during the heating operation, thereby making it impossible to cater to various demands by consumers and to simultaneously perform the heating and the cooling operations, although there is an advantage in that both heating and cooling can be executed by one outdoor unit controlling one indoor unit.

By way of still another prior art involving a multipurpose air conditioner for performing simultaneous cooling of various rooms shown in FIG. 3, when refrigerant compressed to a gaseous state of high temperature and high pressure by the compressor 1 is introduced to the outdoor heat exchanger 2, the outdoor heat exchanger 2 serves to cool and liquify the gaseous refrigerant by way of the air blown by the outdoor fan.

The fluid refrigerant of low temperature and high pressure liquefied by the outdoor heat exchanger 2 passes through the expansion valve 3 for being expanded to atomized refrigerant of low temperature and low pressure and is infused simultaneously to two indoor heat exchangers 4 and 8.

Accordingly, the atomized refrigerant in the indoor heat exchangers 4 and 8 reduced to low pressure and low temperature by the expansion valve 3 passes through various pipes, is evaporated and gasified, and takes the heat from the air blown by the indoor fan to cool the indoor air. The cooled air is discharged indoors to thereby perform the cooling operation.

The gaseous refrigerant of low pressure and low temperature cooled by the indoor heat exchangers 4 and 8 is in turn fed into the compressor 1, and as a result, circulates repeatedly through cooling loops which are formed by solid line arrows and dotted line arrows illustrated in FIG. 3.

However, there is another problem in the air conditioner for performing the simultaneous coolings according to the cooling cycle thus described, in that no effective results can be accomplished in case heating of one room and cooling of another room should be performed, although there is an advantage in that various rooms can be simultaneously cooled by connecting various indoor units to one outdoor unit.

Accordingly, the present invention is disclosed to solve the aforementioned problems and it is an object of the present invention to provide a control apparatus of an air conditioner and a method thereof for employing various indoor units connected to one outdoor unit (compressor) to or heat various room spaces either simultaneously or individually.

SUMMARY OF THE INVENTION

In accordance with one aspect of the present invention, there is provided a control apparatus of an air conditioner, the control apparatus comprising:

operation manipulating means for inputting an operating condition covering simultaneous cooling and heating of a plurality of room spaces, simultaneous but separate heating and cooling of a plurality of room spaces, individual cooling and heating of a certain room space while other rooms remain uncontrolled;

control means for controlling a plurality of indoor units with one outdoor unit according to the operating condition input by the operation manipulating means to thereby control the cooling and heating operations of a plurality of room spaces;

compressor driving means for driving a compressor according to control of the control means to thereby perform simultaneous cooling and heating of a plurality of room spaces, simultaneous but separate heating and cooling of a plurality of room spaces and individual cooling and heating of a certain room space while other rooms remain uncontrolled;

four way valve driving means for receiving a control signal output from the control means according to the operating condition input by the operation manipulating means to controllably drive a four way valve so that a passage of refrigerant circulating therein can be changed; and solenoid valve driving means for receiving the control signal output from the control means according to the operating condition input by the operation manipulating means to controllably drive a solenoid valve so that the passage of the refrigerant circulating therein can be opened and closed.

In accordance with another aspect of the present invention, there is provide a control method of an air conditioner, the method comprising the steps of:

inputting an established temperature and operating conditions covering simultaneous cooling and heating of a plurality of room spaces, simultaneous but separate heating and cooling of a plurality of room spaces, individual cooling and heating of a certain room space while other rooms remain uncontrolled;

controlling the passage of the refrigerant circulating therein by controlling on and off operations of the solenoid valve and the four way valve according to the operating conditions input by the inputting step;

driving a compressor by determining an operation frequency according to a difference between the established temperature and a room temperature input by the inputting step; and operating the air conditioner by performing simultaneous cooling and heating of a plurality of room spaces, simultaneous but separate heating and cooling of a plurality of room space, individual cooling and heating of a certain room space while other rooms remain uncontrolled, according to refrigerant passage controlled at the refrigerant passage control step when the compressor is driven at the compressor driving step.

BRIEF DESCRIPTION OF THE DRAWINGS

For a better understanding of the nature and objects of the invention, reference should be made to the following detailed description taken in conjunction with the accompanying drawings in which.

DETAILED DESCRIPTION OF A PREFERRED EMBODIMENT OF THE INVENTION

The preferred embodiment of the present invention will now be described in detail with reference to the accompanying drawings.

Figure 1:
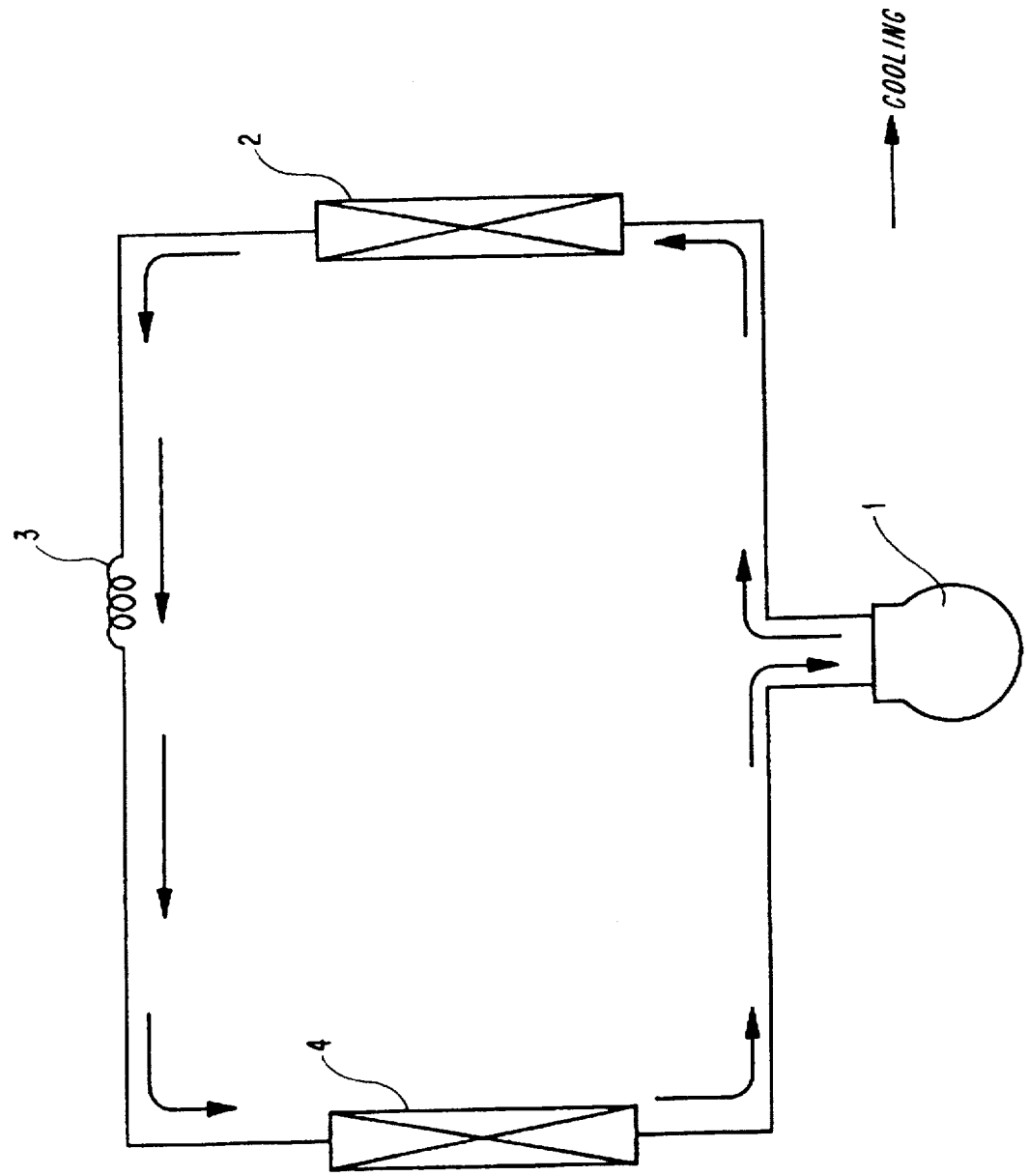
FIG. 1 is a schematic diagram for illustrating a cooling cycle of an air conditioner under cooling operation according to the prior art.
Figure 2:
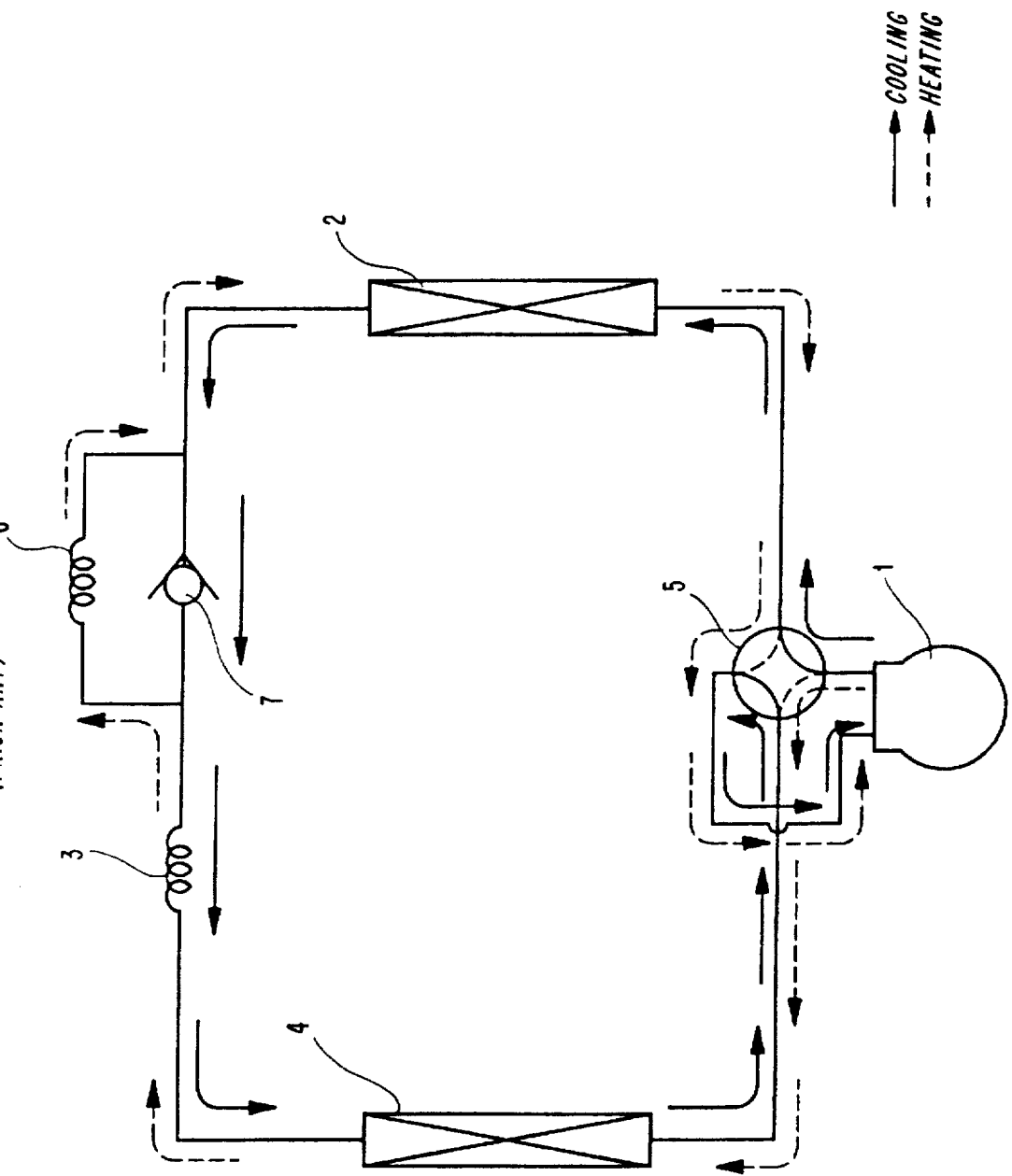
FIG. 2 is a schematic diagram for illustrating a cooling cycle of an air conditioner under cooling and heating operations according to the prior art.
Figure 3:
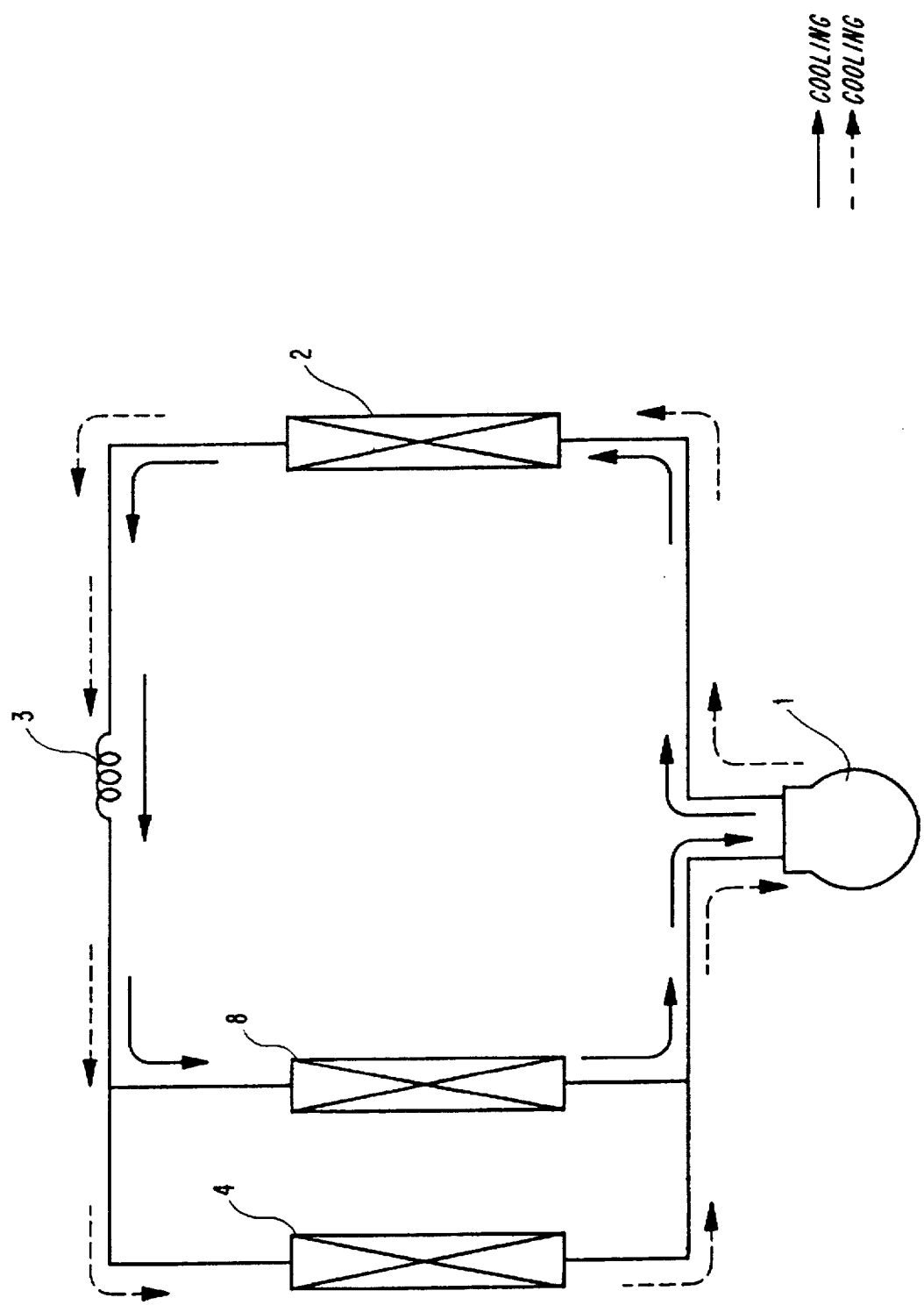
FIG. 3 is a schematic diagram for illustrating a cooling cycle of an air conditioner under a multiple cooling operation according to the prior art.
Figure 4:
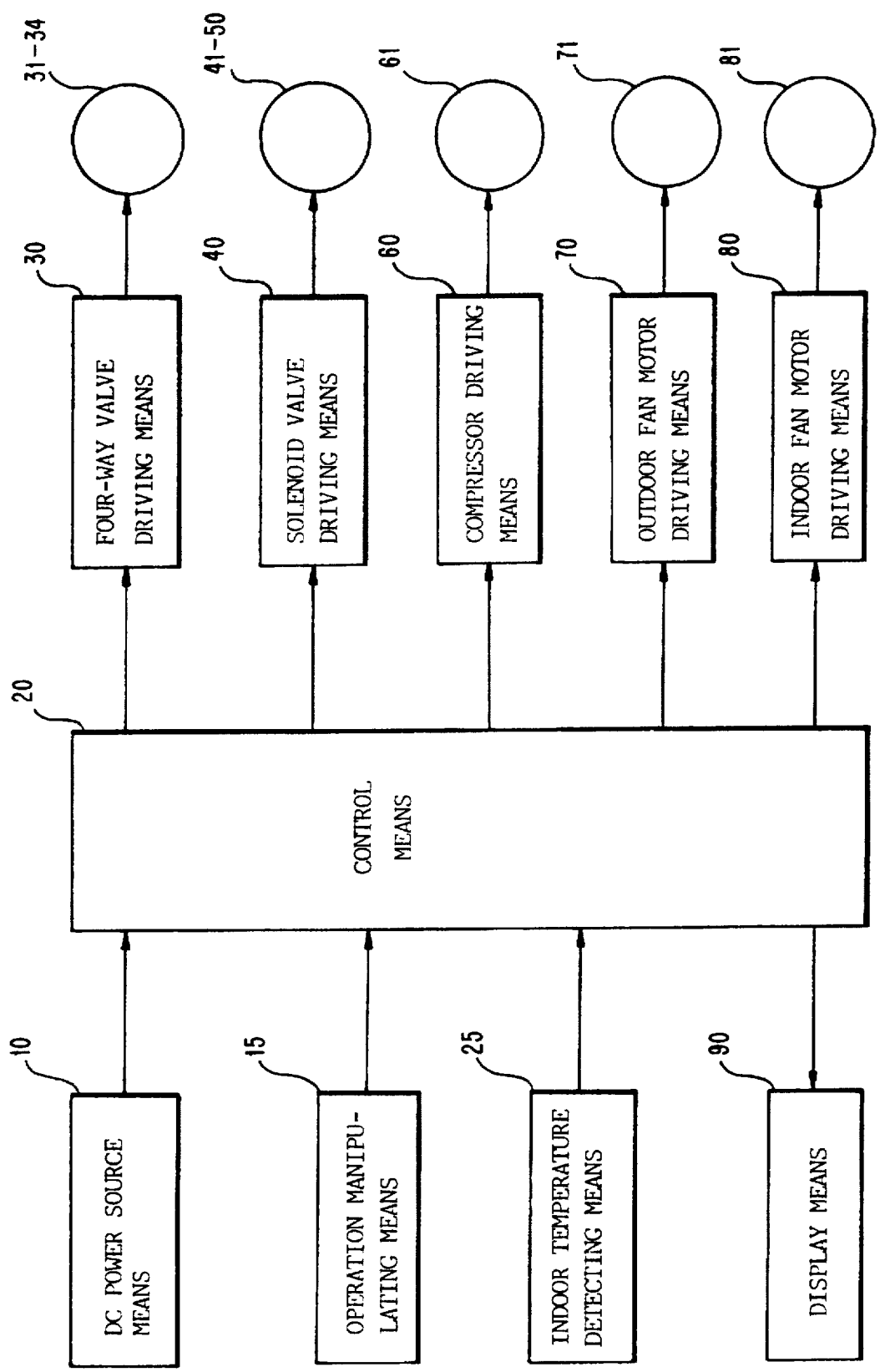
FIG. 4 is a control block diagram for illustrating a control apparatus of an air conditioner according to the present invention.

Referring to FIG. 4, direct current DC electric power source means 10 serves to receive an electrical source voltage of commercial alternating current AC electric power supplied from an alternating current power source terminal to convert the same to a predetermined direct current voltage necessary for operation of the air conditioner and output the same.

Operation manipulating means 15 includes manual operation selecting keys (simultaneous cooling, simultaneous heating, separate but simultaneous cooling and heating, individual cooling, individual heating, defrost, artificial intelligence operation, air cleaning, operation booking, operation/stop and the like) and a plurality of manual functional keys for inputting a set-up temperature, time set-up, set-up wind intensity, set-up wind direction.

Control means 20 is a microcomputer which serves to receive the DC voltage output from the DC power source means 10 to initialize the air conditioner and to control overall operations of the air conditioner according to the operating condition and operation/stop signal input by the operation manipulating means 15.

Indoor temperature detecting means 25 serves to control the room temperature to thereby cause the same to become the temperature established by the user by way of the operation manipulating means 15, so that the air conditioner can be operated. The indoor temperature detecting means 25 also serves to detect a temperature Tr of room air sucked through a suction inlet (not shown) to thereby output the same to the control means 20.

Four-way valve driving means 30 serves to receive a control signal of the control means 20 in order to cause the refrigerant to change the route or passage in which the refrigerant circulates, according to the operating conditions (heating or cooling) input by the operation manipulating means 15, i.e., four-way valves 31, 32, 33 and 34 can be controllably driven to thereby be opened and closed.

Solenoid valve driving means 40 serves to receive the control signal output from the control means 20 in order to open or close the passage in which the refrigerant circulates, according to the operating conditions (heating or cooling) input by the operation manipulating means 15, i.e., solenoid valves 41 through 50 can be controllably driven to be closed and opened.

Furthermore, compressor driving means 60 serves to receive the control signal output from the control means 20 according to a difference between a temperature Ts established by the user by way of the operation manipulating means 15 and the room temperature Tr detected by the indoor temperature detecting means 25 to thereby controllably drive a compressor 61.

Outdoor fan motor driving means 70 serves to receive the control signal of the control means 20 according to the difference between the temperature Ts established by the user and the room temperature Ts detected by the indoor temperature detecting means 25, and to control the operation of an outdoor fan 71 to circulate the air heat-exchanged by an outdoor heat exchanger.

Indoor fan motor driving means 80 serves to receive the control signal output from the control means 20 according to wind intensity selected by the user by way of the operation manipulating means 15 to control operation of an indoor fan 81 so that the air (hot air or cool air) heat-exchanged by an indoor heat exchanger can be blown into the room.

Display means 90 serves to display the operating conditions established by the user by way of the operation manipulating means 15 according to the control of the control means 20 and at the same time, serves to display an operation state of the air conditioner as well.

Figure 5:
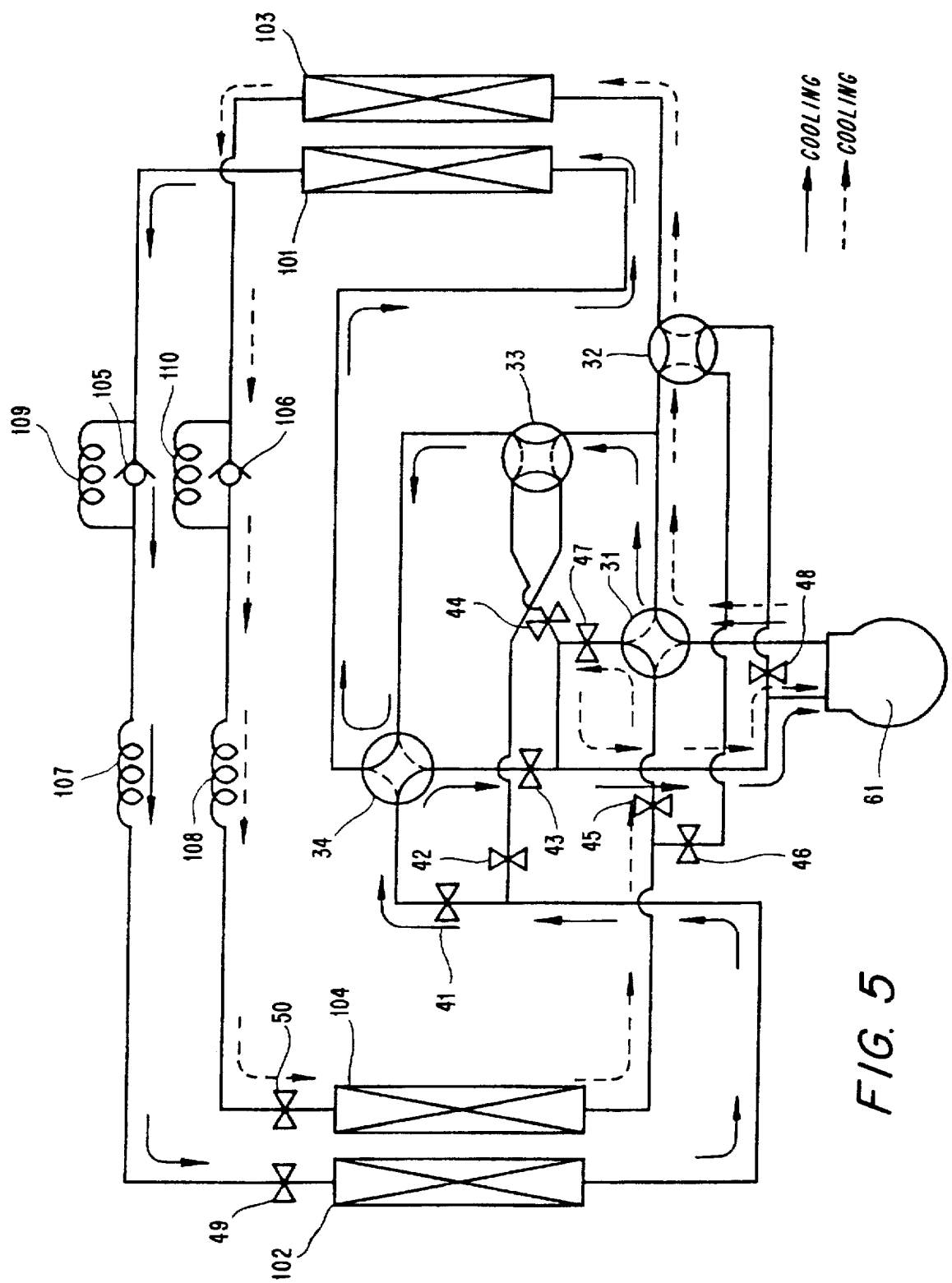
FIG. 5 is a schematic diagram for illustrating a cooling cycle of an air conditioner for the simultaneous cooling of two rooms according to a first operating mode of the present invention.

Referring to FIG. 5, a cooling cycle for performing the cooling and heating operations of the air conditioner thus constructed will now be described.

As illustrated in FIG. 5, the four-way valves 31, 32, 33 and 34 are adapted to be opened and closed by the electric power in order to establish the passage in which the refrigerant circulates according to the control of the control means 20.

The solenoid valves 41 through 50 are arranged to open or close the passage in which the refrigerant circulates according to the control of the control means 20 and are adapted to be opened and closed by the electric power in order to prevent the refrigerant from flowing backward.

The compressor 61 serves to compress the infused refrigerant gas to gaseous state of high temperature and high pressure and discharge the same. The outdoor heat exchanger serves to heat-exchange the refrigerant by way of the air blown by the outdoor fan 71 to thereby cool the same, where one outdoor unit is provided with first and second outdoor heat exchangers 101 and 103 respectively.

The indoor heat exchanger is adapted to heat-exchange the refrigerant with the air blown by the indoor fan 81 to thereby cause the same to be cooled, where a first indoor unit and a second indoor unit are provided with first and second indoor heat exchangers 102 and 104 respectively.

One-way valves 105 and 106 are adapted to prevent the fluid refrigerant of high pressure and high temperature liquefied at the outdoor heat exchangers 101 and 103 from passing through heating expansion valves 109 and 110 during the cooling operation and to prevent the refrigerant liquefied at the indoor heat exchangers 102 and 104 from passing through the heating expansion valves 109 and 110 during the heating operation, so that the refrigerant can pass through in one direction only.

Expansion valves 107 and 108 serve to eject rapidly the refrigerant through small orifices to thereby expand the same to evaporative pressure, so that the refrigerant can become atomized to a foggy state of high pressure and high temperature.

Solenoid valves 49 and 50 are disposed at upper sides of the indoor heat exchangers 102 and 104. When room temperatures Tr of various rooms to be controlled are different one another, the valves 49, 50 serve to open or close the first and second indoor heat exchangers 102 and 104 according to the control of the control means 20, so that various room spaces can be controllably operated to a optimum.

Now, the control apparatus of the air conditioner thus constructed and operational effect of method thereof will be described.

Figure 9A:
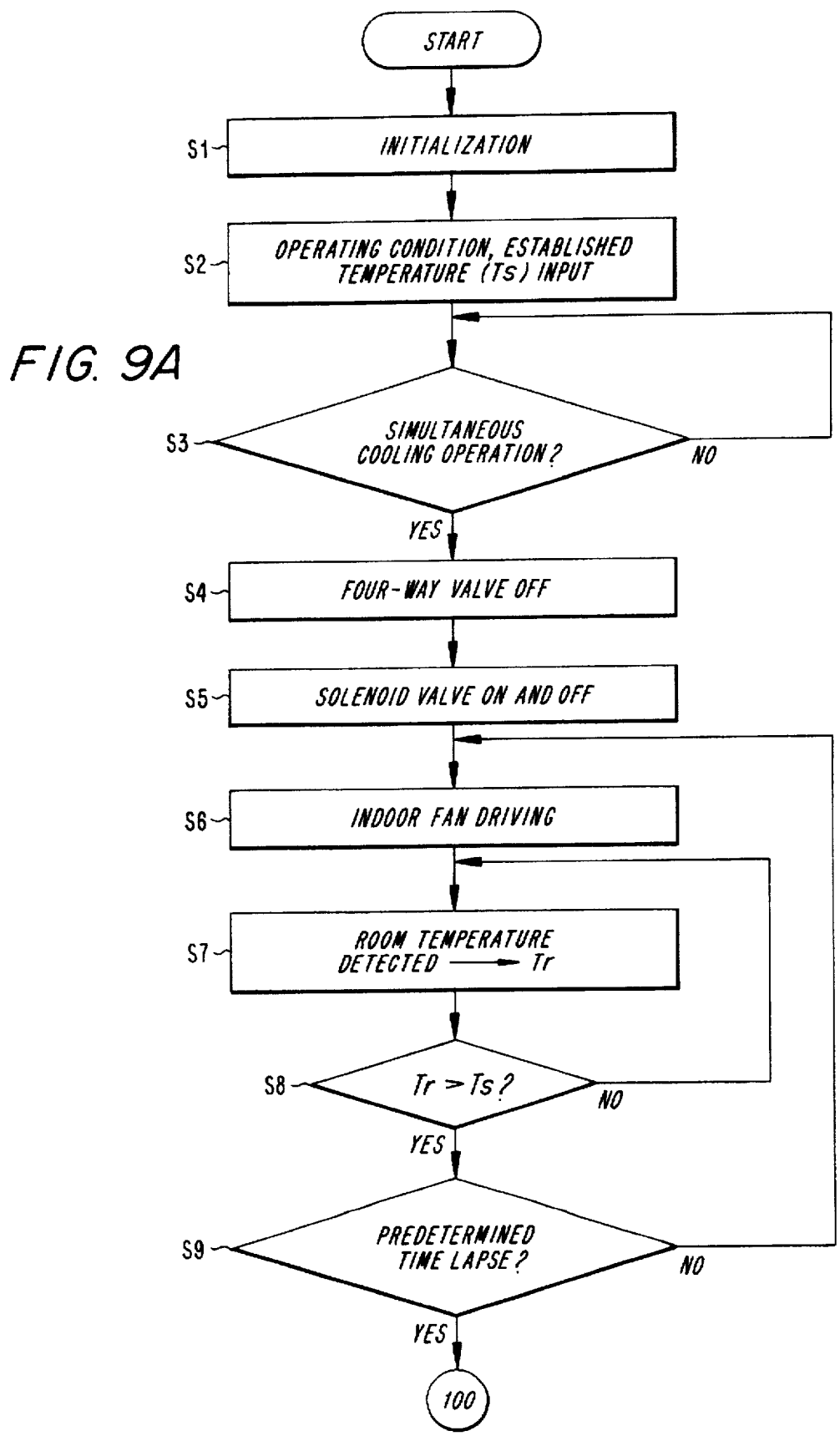
FIG. 9A and 9B are flow charts for illustrating an operational procedure of the first (FIG. 5) operating mode.
Figure 9B:
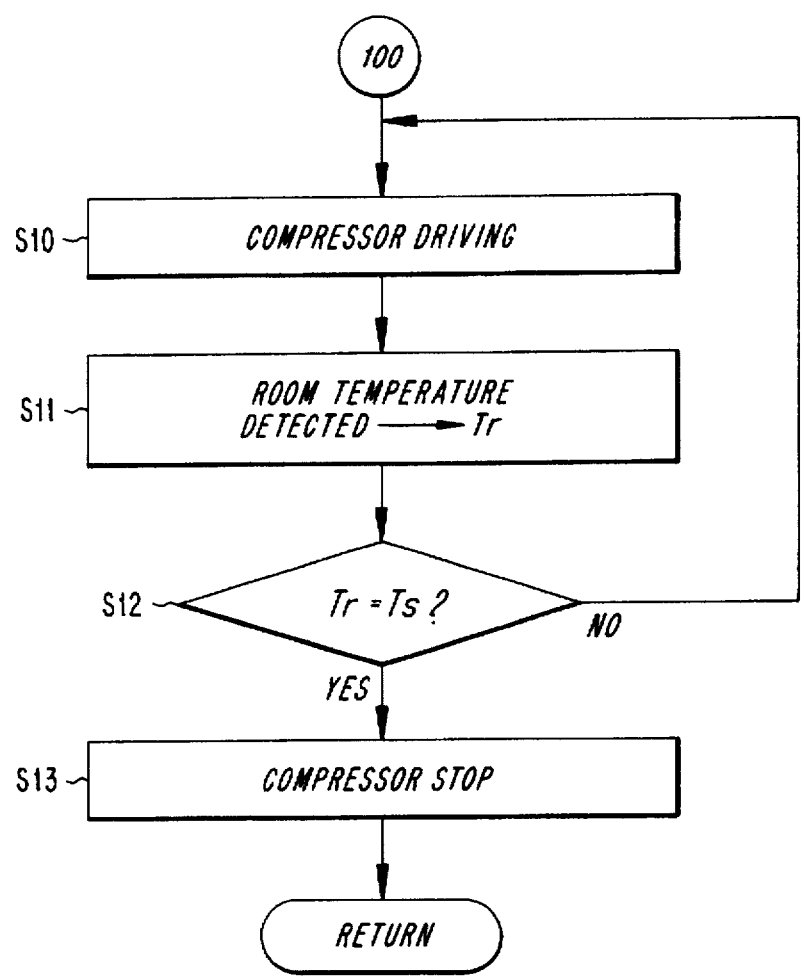

FIGS. 5, 9A and 9B describe, by way of example, a cooling cycle and operation control procedure when two rooms are simultaneously cooled.

First of all, when electricity is supplied to the air conditioner, DC electric power source means 10 serves to convert commercial AC power to a predetermined DC voltage necessary for driving the air conditioner, thereby supplying the same to respective driving circuits and control means 20.

Accordingly, at step S1, the DC voltage output from the DC electric power source means 10 is received by the control means 20 to thereby initialize the air conditioner.

At step S2, the operating conditions (simultaneous cooling, simultaneous heating, separate but simultaneous cooling and heating, individual cooling, individual heating and the like) selected by the user by way of the operation manipulating means 15 and the selected temperature Ts are input to the control means 20, and an operation/stop button is pressed.

At this time, the display means 90 serves to display the operating conditions, and the selected temperature Ts and the like input by the operation manipulating means 15 according to the control of the control means 20.

Successively, at step S3, the control means 20 determines whether the operation condition input by the operation manipulating means 15 is "simultaneous cooling operation", and if it is determined that the condition is not the "simultaneous cooling operation" (in case of no), the control means 20 maintains the air conditioner in operation stand-by state.

As a result of the determination at step S3, if the operating condition input by the operation manipulating means 15 is "simultaneous cooling operation" (in case of yes), the control means 20 at step S4 serves to output a control signal for controlling the four-way valves 31, 32, 33 and 34 and solenoid valves 41 through 50 to simultaneously cool the two room spaces.

Accordingly, the four-way valve driving means 30 receives the control signal output from the control means 20 to thereby deactivate the four-way valves 31, 32, 33 and 34.

At this time, the four-way valves 31 to 34 serve to allow the refrigerant to circulate in a direction depicted by solid lines during valve deactivation, and serve to let the refrigerant circulate in a direction depicted by dotted lines during activation.

At step S5, the control means 20 outputs the control signal for controlling the solenoids 41 through 50 via the solenoid valve driving means 40.

Subsequently, the solenoid valve driving means 40 receives the control signal output from the control means 20 to thereby deactivate the solenoid valves 41, 43, 45, 47, 49 and 50 and at the same time, to activate the solenoid valves 42, 44, 46 and 48.

The solenoid valves 41 through 50 are open during the deactivation period and are closed during the activation period.

At step S6, the control means 20 serves to generate a control signal for driving the indoor fan 81 via indoor fan motor driving means 80.

The indoor fan motor driving means 80 serves to receive the control signal coming out of the control means 20 according to the wind intensity input by the operation manipulating means 75 to thereby control the indoor fan motor and to drive the indoor fan 81.

When the indoor fan is activated, the indoor air starts to be infused into the air conditioner through an inlet (not shown), and at step S7, the temperature Tr of indoor air traveling through the inlet is detected by the indoor temperature detecting means 25, to thereby allow the same to be output to the control means 20.

At this time, it is assumed that the room temperatures Tr of the two rooms detected by the indoor temperature detecting means 25 are identical.

Successively, at step S8, a determination is made as to whether the common room temperature Tr detected by the indoor temperature detecting means 25 is larger than the selected temperature Ts input by the operation manipulating means 15, and if it is determined that the indoor temperature Tr is not larger than the selected temperature Ts (in case of no), flow returns to step S7 because there is no need to cool the room, and the room temperature Tr is continuously detected.

As a result of step S8, if it is determined that the room temperature Tr is larger than the selected temperature Ts (in case of yes), the rooms should be cooled, so that, at step S9, a determination is made as to whether a predetermined time (delay time for protecting the compressor: approximately 3 minutes) has lapsed after the indoor fan is activated at step S6, and if the predetermined time has not elapsed (in case of no), flow returns to step S6 and drives only the indoor fan 81 until the predetermined time lapses.

As a result of the determination at step S9, if the predetermined time has lapsed (in case of yes), which means that there is no problem to the compressor 61 even it is driven because the consumed current is constant, the control means 20, at step S10, determines an operational frequency of the compressor 61 according to the difference between the room temperature Tr and the selected temperature Ts and outputs a control signal for driving the compressor 61 to compressor driving means 60.

Accordingly, the compressor driving means 60 serves to drive the compressor 61 according to the operational frequency determined by the control means 20.

When the compressor 61 is driven, the refrigerant gas is compressed to gaseous state of high temperature and high pressure and, according to the afore-mentioned activation and deactivation of the four-way valves 31, 32, 33 and 34 and solenoid valves 41 through 50 by way of the control of the control means 20, is infused to the first and second outdoor heat exchangers 101 and 103 through the four-way valves 31, 32, 33 and 34.

The first and second outdoor heat exchangers 101 and 103 serve to heat-exchange the gaseous refrigerant compressed to high temperature and high pressure with the air blown by the outdoor fan 71, to forcibly cool the refrigerant and to liquefy the same.

The fluid refrigerant of low temperature and high pressure liquefied by the first and second outdoor heat exchangers 101 and 103 is reduced to atomized refrigerant of low temperature and low pressure through one-way valves 105 and 106 and through expansion valves 107 and 108, and is infused to the first and second indoor heat exchangers 102 and 104 through the solenoid valves 49 and 50.

Accordingly, the first and second indoor heat exchangers 102 and 104 serve to take out the heat from the air blown by the indoor fan 81 when the atomized refrigerant reduced to low temperature and low pressure by the expansion valves 107 and 108 passes through a plurality of pipes to thereby cool the room air and discharge the cooled air indoors to perform the cooling operation.

At this time, the gaseous refrigerant of low pressure and low temperature cooled by the first and second indoor heat exchangers 102 and 104 is infused again into the compressor 61 through the solenoid valves 41 through 48 and is repeatedly circulated through two cooling cycles as illustrated by solid line arrows (→) and dotted line arrows (--→) in FIG. 5.

In other words, the refrigerant flows through a solid-arrow cooling cycle for one room where the cool air heat-exchanged by the first indoor heat exchanger 102 is discharged indoors, which cycle is formed by the compressor 61→four-way valves 31, 33 and 34→first outdoor heat exchanger 101→one-way valve 105→expansion valve 107→solenoid valve 49→first indoor heat exchanger 102→solenoid valve 41→four-way valve 34→solenoid valve 43→compressor 61, and as illustrated in FIG. 5 in solid line arrows (→) the refrigerant is circulated to thereby perform the indoor cooling operation.

Furthermore, the refrigerant flows through a dotted-arrow cooling cycle for another room where the cool air heat-exchanged by the second indoor heat exchanger 104 is discharged indoors, which cycle is formed by the compressor 61→four-way valves 31 and 32→second outdoor heat exchanger 103→one-way valve 106→expansion valve 108→solenoid valve 50→second indoor heat exchanger 104→solenoid valve 45→four-way valve 31→solenoid valve 47→compressor 61, and the refrigerant is circulated along the dotted line arrows illustrated in FIG. 5 to thereby execute the indoor cooling operation.

As noted above, the air conditioner is adapted to one outdoor unit (compressor) which is in turn connected to two indoor units, so that two room spaces can be simultaneously cooled according to the operating condition established by the user.

At this time, at step S11, the room temperature Tr (assumed as the same for both rooms) which changes when the compressor 1 is being driven is detected by the indoor temperature detecting means 25 to allow the same to be output to the control means 20, and at step S12, it is determined whether the room temperature Tr detected by the indoor temperature detecting means 25 is the same as the selected temperature Ts input by the user by way of the operation manipulating means 15.

As a result of the determination at step S12, if the room temperature Tr is not the same as the selected temperature Ts (in case of no), which means that the room has to be cooled continuously, flow returns to step S11.

Meanwhile, as a result of the determination at step S12, if the room temperature Tr is the same as the selected temperature Ts (in case of yes), which means that the room cooling should be stopped, flow proceeds to step S13, where the control means 20 outputs a control signal for stopping a driving of the compressor 61 to compressor driving means 60.

Accordingly, the compressor driving means 60 serves to stop the driving of the compressor 61 according to the control of the control means 20 to thereby stop the operation.

In the above-mentioned description, an example has been disclosed to describe a case where the room temperatures Tr of two rooms are identical. However, in case of the two rooms having different room temperatures Tr (by way of example, 30 degrees celsius in a first indoor unit while 25 degrees celsius in a second indoor unit), the operational frequency of the compressor 61 is determined based on the room temperature (30 degrees celsius) of the first indoor unit where the room temperature is higher and then the compressor 61 is driven.

When the compressor 61 is driven, the second indoor unit which has first reached the selected temperature is stopped because the second indoor unit where the room temperature Tr is lower (25 degrees celsius) reaches the selected temperature Ts faster than the first indoor unit where the room temperature is higher (30 degrees celsius), and only the first indoor unit which has not reached the selected temperature Ts should then be cool-operated.

Accordingly, the control means 20 serves to control the solenoid valves 49 and 50 disposed at the first and second indoor heat exchangers 102 and 104, so that the solenoid valve 50 of the second indoor heat exchanger 104 at the second indoor unit which has first reached the selected temperature Ts is caused to be closed.

The solenoid valve 49 of the first indoor heat exchanger 102 at the first indoor unit which has not reached the established temperature Ts, so that the passage where the refrigerant is circulated therein can remain open.

Of course, in case the room temperatures are reversed (by way of example, 25 degrees in celsius for the first indoor unit and 30 degrees celsius for the second indoor unit), the solenoid valve 49 at the first indoor unit where the selected temperature Ts is first reached is caused to be turned on to thereby close the passage, and the solenoid valve 50 at the second indoor unit where the selected temperature Ts is not reached remains deactivated, to thereby keep open the passage.

Next, simultaneous heating of two room spaces will be described with reference to FIG. 6 and FIGS. 10A and 10B.

Figure 6:
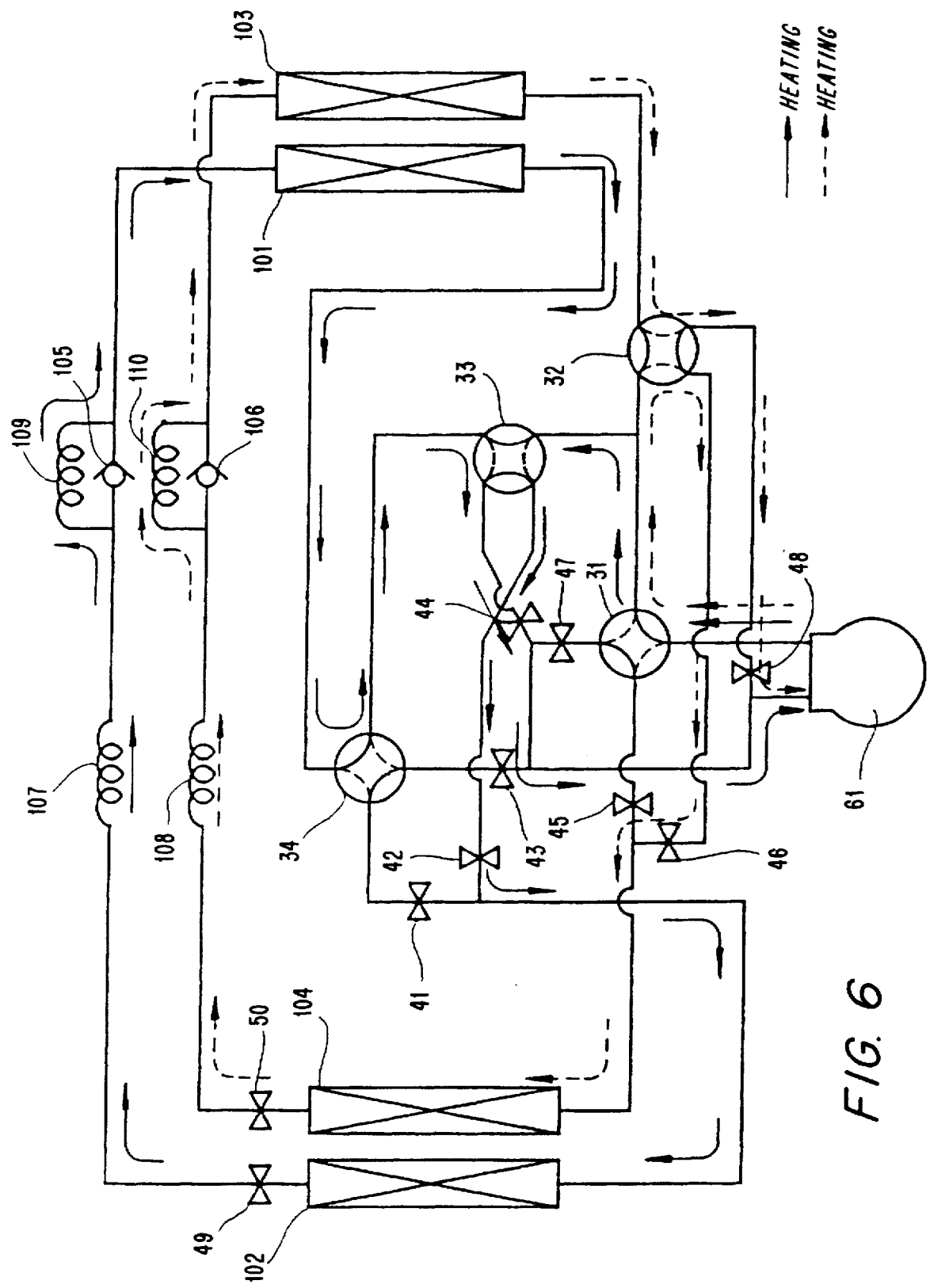
FIG. 6 is a schematic diagram for illustrating a cooling cycle of an air conditioner for the simultaneous heating of two rooms according to a second operating mode of the present invention.
Figure 10A:
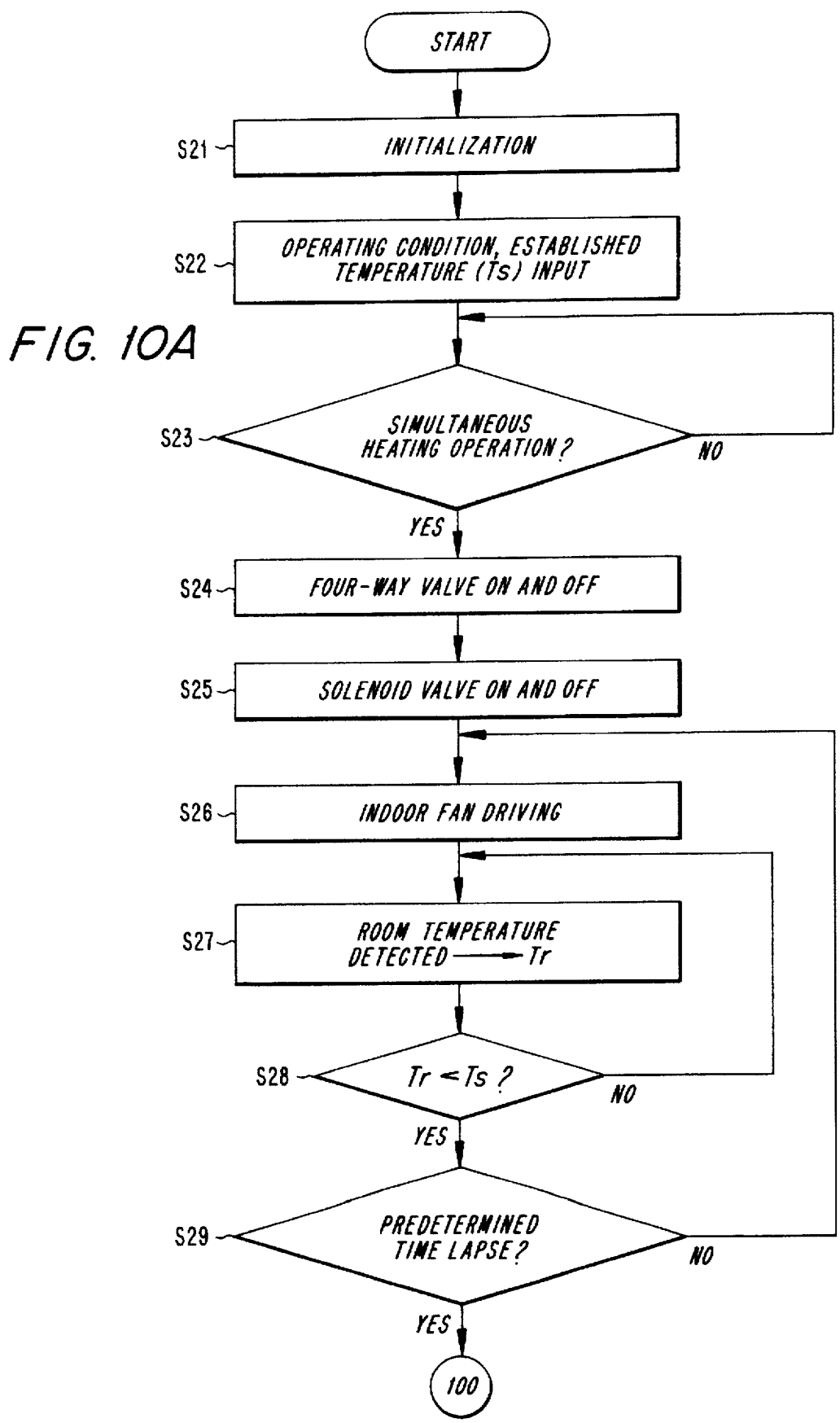
FIG. 10A and 10B are flow charts for illustrating an operational procedure of the second (FIG. 6) operating mode.
Figure 10B:
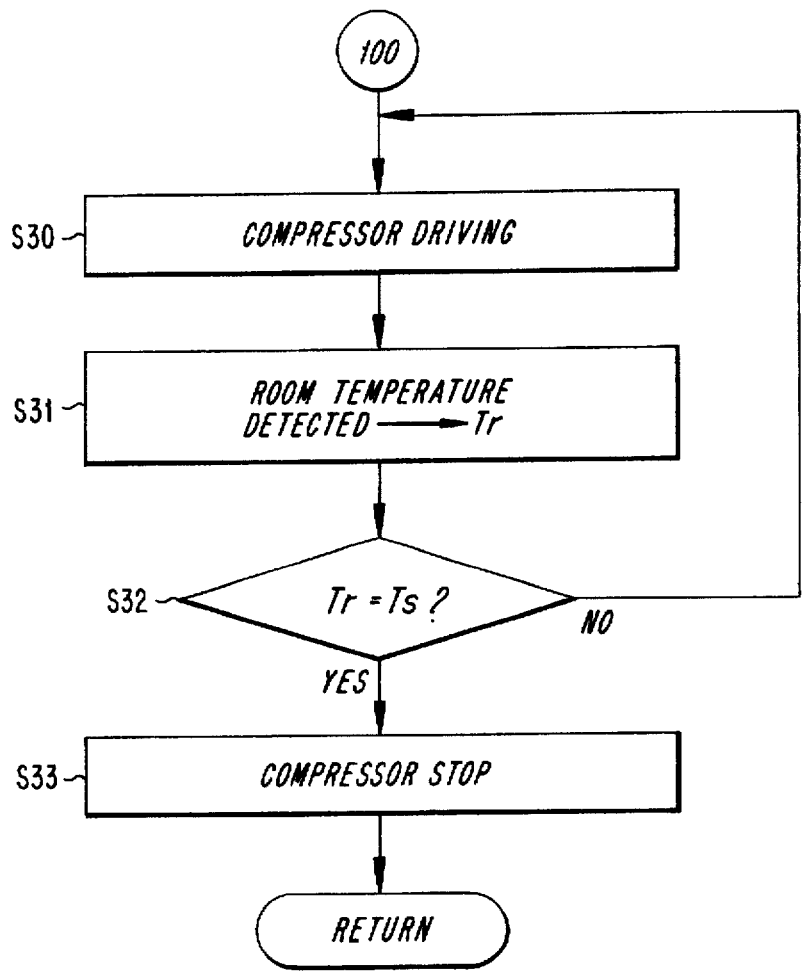

FIG. 6 is a cooling cycle for illustrating a simultaneous heating operation of an air conditioner according to a second operating mode of the present invention, and FIGS. 10A and 10B are flow charts for illustrating operational procedures of simultaneous heating control of an air conditioner according to the present invention.

First of all, when the power is supplied to the air conditioner, DC power source means 10 serves to convert the commercial AC voltage supplied from an AC power source terminal (not shown) to a predetermined DC voltage necessary for driving the air conditioner, thereby outputting the same to respective driving circuits and the control means 20.

Accordingly, at step S21, the control means 20 serves to receive the DC voltage output from the DC power source means 10 to thereby initialize the air conditioner. At step S22, the operating conditions of the air conditioner desired by the user (simultaneous cooling, simultaneous heating, separate but simultaneous cooling and heating, individual cooling, individual heating and the like) and the selected temperature Ts are input to the control means 20 and the operation/stop button is pressed.

At this time, the display means 90 serves to display the operating conditions input by the operation manipulating means 15 and the selected temperature Ts and the like according to the control of the control means 20.

Successively, at step S23, the control means 20 determines whether the operating conditions input by the operation manipulating means 15 is the "simultaneous heating operation", and if it is determined as not being "simultaneous heating operation", (in case of no), the air conditioner is maintained at the operation stand-by state.

As a result of the determination at step S23, if the operating condition input by the operation manipulating means 15 is the I simultaneous heating operation", (in case of yes), which means that the four-way valves 31, 32, 33 and 34 and the solenoid valves 41 through 50 should be controlled to simultaneously heat the two room spaces, the control means 20 at step S24 outputs a control signal for controlling the four-way valves 31, 32, 33 and 34 via the four-way valve driving means 30.

Accordingly, the four-way valve driving means 30 receives the control signal output from the control means 20 to thereby deactivate the four-way valves 31 and 34 and at the same time, to activate the four-way valves 32 and 33.

At this time, the four-way valves 31, 32, 33 and 34 allow the refrigerant to be circulated in a direction depicted by solid lines, during deactivation, and allow the refrigerant to be circulated in a direction depicted by dotted lines when activated.

Successively, at step S25, the control means 20 serves to generate a control signal for controlling the solenoid valves 41 through 50 to the solenoid valve driving means Therefore, the solenoid valve driving means 40 receives the control signal output from the control means 20 to thereby deactivated the solenoid valves 42, 44, 46, 48, 49 and 50 and at the same time, to activate the solenoid valves 41, 43, 45 and 47.

At step S26, the control means 20 serves to generate a control signal for driving the indoor fan 81 via the indoor fan driving means 80.

Accordingly, the indoor fan motor driving means 80 serves to receive the control signal output from the control means 20 according to the established wind intensity input by the operation manipulating means 15, thereby controlling the indoor fan motor and driving the indoor fan 81.

When the indoor fan 81 is driven, the room air starts to be infused into the air conditioner through an inlet (not shown).

At step S27, the temperature of the room air traveling through the inlet is detected by the indoor temperature detecting means 25, to thereby cause the same to be output to the control means 20.

At this time, if it is assumed that the room temperatures Tr of the two rooms detected by the indoor temperature detecting means 25 are the same, a discrimination is made at step S28 as to whether the common room temperature Tr detected by the indoor temperature detecting means 25 is smaller than the selected temperature input by the operation manipulating means 15, and if the room temperature Tr is not smaller than the selected temperature Ts (in case of no), which means that there is no need to heat the room, flow returns to step S27 and keeps detecting the room temperature Tr.

As a result of step S28, if it is determined that the room temperature Tr is smaller than the selected temperature Ts (in case of yes), which calls for heating in the room, a determination is made at step S29 as to whether a predetermined time (delayed time for protecting the compressor: approximately 3 minutes) has elapsed after the indoor fan 81 is driven at step S26.

If the predetermined time has not lapsed (in case of no), flow returns to step S26 and drives the indoor fan 81 only until the predetermined time lapses.

As a result of step S29, if the predetermined time has lapsed (in case of yes), which means that there is no problem to be incurred to the compressor 61 even if it is driven because the consumed current is constant, so that the control means 20 determines at step S30 the operating frequency of the compressor 61 according to the difference between the room temperature Tr and the selected temperature Ts, thereby causing a control signal for driving the compressor 61 to be fed to the compressor driving means 60.

Accordingly, the compressor driving means 60 serves to drive the compressor 61 according to the operating frequency determined by the control means 20.

When the compressor 61 is driven, the refrigerant gas is compressed by the compressor 61 to a gaseous state of high temperature and of high pressure according to on/off operation of the four-way valves 31, 32, 33 and 34 and the solenoid valves 41 through 50 by way of the control of the control means 20 to thereby be infused into the first and second indoor heat exchangers 102 and 104 through the four-way valves (31, 33), (31, 32) and the solenoid valves 42 and 46.

The first and second indoor heat exchangers 102 and 104 serve to heat-exchange the gaseous refrigerant compressed to high temperature and high pressure by the first and second indoor heat exchangers 102 and 104 by way of the air blown by the indoor fan 81, so that warm air generated by the cooling of the refrigerant of room temperature and of high pressure can be discharged indoors to thereby cause the heating operation to be executed.

The fluid refrigerant of low temperature and high pressure liquefied by the first and second indoor heat exchangers 102 and 104 passes through the expansion valves 107 and 108 for being expanded to evaporative pressure, and passes through expansion valves 109 and 110 through the solenoid valves 49 and 50, to thereby be reduced to atomized refrigerant of low pressure and low temperature and is infused into the first and second outdoor heat exchangers 101 and 103.

The first and second outdoor heat exchangers 101 and 103 serve to receive the atomized refrigerant reduced to low pressure and low temperature by way of the expansion valves 107 and 108 and expansion valves 109 and 110, to thereby heat-exchange the air blown by the outdoor fan 71 by way of latent heat of the refrigerant and to cool the same.

The gaseous refrigerant of low pressure and low temperature cooled by the first and second outdoor heat exchangers 101 and 103 is in turn conducted into the compressor 61 through the four-way valves (34, 33) and (32), and through the solenoid valves 44 and 48, and flows in two heating cycles of repeated circulation as illustrated solid line arrows (→) and dotted line (→) in FIG. 6.

In other words, the refrigerant flows through a solid-line heating cycle for one room where the warm air (warm wind) heat-exchanged by the first indoor heat exchanger 102 is discharged indoors, which cycle is formed by the compressor 61→four-way valve 31 and 33→solenoid valve 42→first indoor heat exchanger 102→solenoid valve 49→expansion valve 107 expansion valve for heating 109→first outdoor heat exchanger 101 four-way valves 34 and 33→solenoid valve 44→compressor 61, so that the refrigerant can be circulated along the solid line arrows (→) in FIG. 6 to thereby perform the room heating.

Furthermore, the refrigerant flows through a dotted line heating cycle for another room where the warm air (warm wind) heat-exchanged by the second indoor heat exchanger 104 is discharged indoors, which cycle is formed by the compressor 61→four-way valves 31 and 32→solenoid valve 46→second indoor heat exchanger 104→solenoid valve 50→expansion valve 108 expansion valve for heating 110→second outdoor heat exchanger 103 four-way valve 32→solenoid valve 48→compressor 61, so that the refrigerant can be circulated along the dotted line arrows in FIG. 6 to thereby perform the room heating.

As is apparent from the above, the air conditioner having one outdoor unit (compressor) connected to two indoor units can heat two room spaces simultaneously according to the operating conditions established by the user.

At this time, the room temperature Tr which changes when the compressor 61 is driven is detected at step S31 by the indoor temperature detecting means 25, to allow the same to be output to the control means 20.

A determination is made at step S32 as to whether the room temperature Tr detected by indoor temperature detecting means 25 is the same as the selected temperature Ts input by the user by way of the operation manipulating means 15.

As a result of step S32, if the room temperature Tr is not the same as the selected temperature Ts (in case of no), which implies that the room should be continuously heated, flow returns to step S30.

Meanwhile, as a result of the determination at step S32, if the room temperature Tr is the same as the selected temperature Ts (in case of yes), which represents that the room heating should be stopped, flow proceeds to step S33, where the control means 20 serves to output a control signal for stopping the drive of the compressor 61 to the compressor driving means 60.

Accordingly, the compressor driving means 60 stops the driving of the compressor 61 according to the control of the control means 20 to thereby terminate the operation.

Although the above-mentioned description has described, by way of example, a case where the room temperatures Tr of two rooms to be heated are the same, in case the room temperatures Tr of the two rooms are different (by way of example, 5 degrees celsius for the first indoor unit and 10 degrees celsius for the second indoor unit), the operating frequency of the compressor 61 is determined based on the room temperature (5 degrees celsius) at the first indoor unit where the room temperature Tr is lower, to thereby drive the compressor 61.

When the compressor 61 is driven, the second indoor unit which has first arrived at the established temperature Ts stops the heating operation because the second indoor unit where the room temperature Tr is higher (10 degrees celsius) reaches the selected temperature Ts faster than the first indoor unit where the room temperature Tr is lower (5 degrees celsius), so that only the first indoor unit which has not reached the selected temperature Ts should be operated for heating.

Accordingly, the control means 20 serves to control the solenoid valves 49 and 50 disposed at the first and second indoor heat exchangers 102 and 104, so that the solenoid valve 50 of the second indoor heat exchanger 104 at the second indoor unit which has first arrived at the selected temperature Ts is turned on, to thereby cut off the passage in which the refrigerant is circulated.

The solenoid valve 49 arranged at the first indoor heat exchanger 102 which has not reached the selected temperature Ts is caused to remain deactivated, thereby keeping open the passage where the refrigerant is circulated.

Of course, in case the room temperatures Tr are reversed (by way of example, 10 degrees celsius for the first indoor unit and 5 degrees celsius for the second indoor unit), the solenoid valve 49 at the first indoor unit which has first arrived at the selected temperature Ts is made to be operative, thereby cutting off the passage of the refrigerant circulation, and the solenoid valve 50 at the second indoor unit which has not reached the established temperature Ts remains deactivated, thereby keeping open the passage.

Consequently, two separate room spaces having different room temperatures Tr can be controllably heated to an optimum state.

Next, a description will be made as to a case where one room is heated while the other room is cooled.

The operations of the step S8 or S28 and the step S12 or S32 described in the flow charts in FIGS. 9A and 9B and FIGS. 10A and 10B are identical, so that redundant descriptions thereof will be omitted, and only the refrigerant circulating process of the cooling cycle will be described which changes according to on/off operations of the four-way valves 31, 32, 33 and 34 and the solenoid valves 41 through 50 by way of control of the control means 20.

First of all, a case where the first room is cooled while the second room is heated will be described with reference to FIG. 7.

Figure 7:
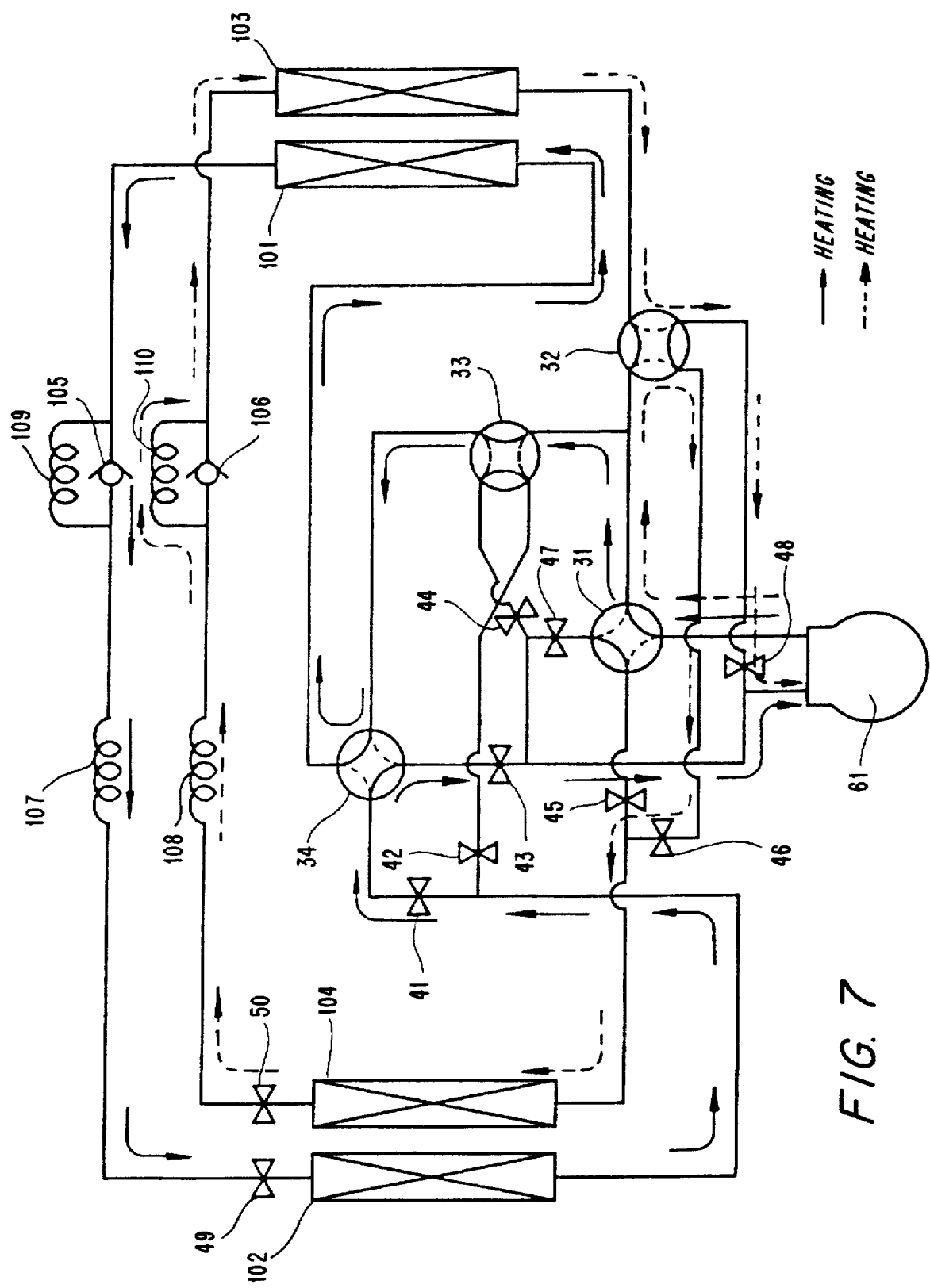
FIG. 7 is a schematic diagram for illustrating a cooling cycle of an air conditioner for the separate but simultaneous cooling and heating of two rooms according to a third operating mode of the present invention.

FIG. 7 is a schematic diagram for illustrating simultaneous heating and cooling operations of an air conditioner according to a third operating mode of the present invention.

When a heating operation of the second room and a cooling operation of the first room are selected by the user's manipulation of the operation manipulating means 15, the four-way valves 31, 33 and 34 and the solenoid valves 41, 43, 46, 48, 49 and 50 become deactivated while the four-way valve 32 and the solenoid valves 42, 44 and 45 become activated.

In the cooling operation of the first room according to the on/off operations of the four-way valves 31, 32, 33 and 34 and the solenoid valves 41 through 50 by way of the control of the control means 20, the refrigerant compressed by the compressor 51 to gaseous state of high pressure and high temperature is introduced to the first outdoor heat exchanger 101 through the four-way valves 31, 33 and 34, and the first outdoor heat exchanger 101 heat exchanges the gaseous refrigerant with the air blown by the outdoor fan 71, so that the refrigerant is forcibly cooled and liquefied.

The liquid refrigerant liquefied by the first outdoor heat exchanger 101 is reduced to atomized refrigerant of low pressure and low temperature when the same passes through the expansion valve 107 for being expanded to evaporative pressure via the one-way valve 105, and is infused into the first indoor heat exchanger 102 through the solenoid valve 49.

Accordingly, the first indoor heat exchanger 102 removes heat from the air blown by the indoor fan 81 to thereafter be cooled when the atomized refrigerant reduced to low pressure and low temperature by the expansion valve 107 is evaporated and gasified via a plurality of pipes, where the cooled air (cool wind) is discharged indoors to thereby perform the cooling operation.

At this time, the gaseous refrigerant of low pressure and low temperature cooled by the first indoor heat exchanger 102 is in turn fed into the compressor 61 through the solenoid valve 41, the four-way valve 34 and the solenoid valve 43, and is circulated in a repeated cooling cycle as illustrated by solid line arrows (→) in FIG. 7.

In other words, the refrigerant in the cooling cycle, where the cool air (cool wind) heat-exchanged by the first indoor heat exchanger 102 is discharged indoors, flows through a cycling loop which is formed by the compressor 61→four-way valves 31, 33 and 34→first outdoor heat exchanger 101 one-way valve 105→expansion valve 107→solenoid valve 49→first indoor heat exchanger 102→solenoid valve 41→four-way valve 34→solenoid valve 43→compressor 61, to thereafter perform the cooling operation of the room.

Furthermore, in the heating operation of the second indoor unit driven by the four-way valves 31, 32, 33 and 34 and the solenoid valves 41 through 50 according to the control of the control means 20, the refrigerant compressed by the compressor 61 to gaseous state of high exchanger 104 is conducted through the four-way valves 31 and 32 and through the solenoid valve 46, and the second indoor heat exchanger 104 serves to heat-exchange the gaseous refrigerant compressed to high temperature and high pressure by way of the air blown by the indoor fan 81, so that the warm wind generated when the refrigerant of room temperature and high pressure is cooled is discharged indoors to thereby perform the heating operation.

The fluid refrigerant of low temperature and high pressure liquefied by the second indoor heat exchanger 104 passes through the expansion valve 108 for expanding the same to evaporative pressure and the expansion valve 110 via the solenoid valve 50, to thereafter be reduced to atomized refrigerant of low temperature and low pressure and infused into the second outdoor heat exchanger 103.

Accordingly, the second outdoor heat exchanger 103 serves to receive the atomized refrigerant reduced by the expansion valve 108 and the expansion valve 110 to low pressure and low temperature, and to heat-exchange the air blown by the outdoor fan 71 by way of the evaporative latent heat of the refrigerant, to cool the same.

The gaseous refrigerant of low temperature and low pressure cooled by the second outdoor heat exchanger 103 is in turn fed into the compressor 61 through the four-way valve 32 and the solenoid valve 48 and flows through a cooling cycle of repeated circulation as illustrated by dotted line arrows (→) in FIG. 7.

In other words, the refrigerant in the cooling cycle, where warm wind heat-exchanged by the second indoor heat exchanger 104 is discharged indoors, flows through a circulation loop which is formed by the compressor 61→four-way valves 31 and 32→solenoid valve 46→second indoor heat exchanger 104→solenoid valve 50→expansion valve 108→expansion valve for heating 110→second outdoor heat exchanger 103→four-way valve 32→solenoid valve 48→compressor 61, thereby performing the heating of the room.

Next, a case where the first indoor unit is heated while the second indoor unit is cooled will be described with reference to FIG. 8.

Figure 8:
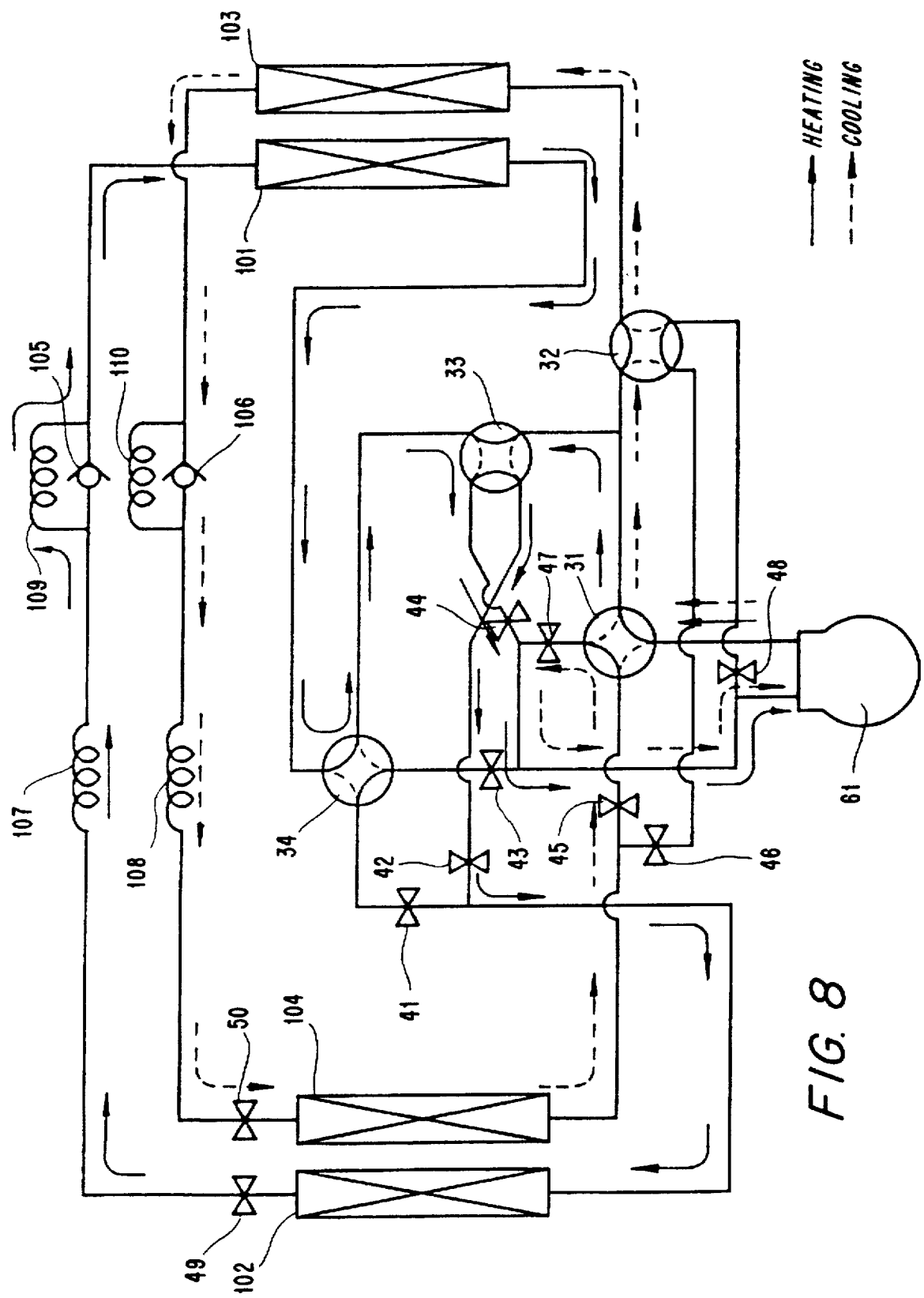
FIG. 8 is a schematic diagram for illustrating a cooling cycle of an air conditioner for the separate but simultaneous cooling and heating of two rooms according to a fourth operating mode of the present invention.

FIG. 8 is a schematic diagram for illustrating heating and cooling operations of an air conditioner according to a fourth operating mode of the present invention.

When the heating operation of the first indoor unit 102 and cooling operation of the second indoor unit 104 are selected by the user's manipulation of the operation manipulating means 15, the four-way valves 42, 44, 45, 47, 49 and 50 become deactivated according to the control of the control means 20, and the four-way valve 33 and solenoid valves 41, 43, 46 and 48 are activated.

In the heating operation of the first indoor unit according to the on/off operations of the four-way valves 31, 32, 33 and 34 and the solenoid valves by way of the control of the control means 20, the refrigerant compressed by the compressor 61 to gaseous state of high pressure and high temperature is infused into the first indoor heat exchanger 102 via the four-way valves 31 and 33 and the solenoid valve 42, and the first indoor heat exchanger 102 serves to heat-exchange the gaseous refrigerant by way of the air blown by the indoor fan 81, so that the warm wind generated when the refrigerant of room temperature and high pressure is cooled is discharged indoors, to thereby perform the heating operation.

The fluid refrigerant of low temperature and high pressure liquefied by the first indoor heat exchanger 102 passes through the expansion valves 107, 109 via the solenoid valve 49, to thereby be reduced to atomized refrigerant of low temperature and low pressure and to be infused into the first outdoor heat exchanger 101.

Accordingly, the first outdoor heat exchanger 101 serves to receive the atomized refrigerant, and heat-exchange the air blown by the outdoor fan 71 by way of the evaporative latent heat of the refrigerant and cool the same.

The gaseous refrigerant of low pressure and low temperature cooled by the first outdoor heat exchanger 101 is in turn infused into the compressor 61 through the four-way valves 34 and 33 and the solenoid valve 44, and flows in a cooling cycle of repeated circulation as illustrated by solid line arrows in FIG. 8.

In other words, the refrigerant in the cooling cycle, where the warm wind heat-exchanged by the first indoor heat exchanger 102 is discharged indoors, circulates in a loop which is formed by the compressor 61→four-way valves 31 and 33→solenoid valve 42→first indoor heat exchanger 102→solenoid valve 49→expansion valve 107 expansion valve for heating 109→first outdoor heat exchanger 101 four-way valves 34 and 33→solenoid valve 44→compressor 61, to thereby perform the heating of the room.

In the cooling operation of the second indoor unit 104 according to on and off operations of the four-way valves 31, 32, 33 and 34 and the solenoid valves 41 through 50 by way of the control of the control means 20, the refrigerant compressed by the compressor 61 to gaseous state of high temperature and high pressure is infused into the second outdoor heat exchanger 103 through the four-way valves 31 and 32, and the second outdoor heat exchanger 103 serves to heat-exchange the gaseous refrigerant compressed to high temperature and high pressure by way of the air blown by the outdoor fan 71, forcibly cooling the refrigerant and liquefying the same.

The liquid refrigerant of low temperature and high pressure liquefied by the second outdoor heat exchanger passes the expansion valve 108 for expanding the same to evaporative pressure via the one-way valve 106, to thereby be reduced to atomized refrigerant of low pressure and low temperature, and is infused to the second indoor heat exchanger 104 via the solenoid valve 50.

Accordingly, the second indoor heat exchanger 104 serves to absorb the heat from the air blown by the indoor fan 81 and discharge the cooled air (cool wind) to the room and perform the cooling operation.

At this time, the gaseous refrigerant of low temperature and low pressure cooled by the second indoor heat exchanger 104 is in turn conducted into the compressor 61 through the solenoid valve 45, four-way valve 31 and through the solenoid valve 47, so that the refrigerant flows in a cooling cycle of repeated circulation an illustrated by dotted line arrows in FIG. 8.

In other words, the refrigerant in the cooling cycle where the cool wind heat-exchanged by the second indoor heat exchanger 104 is discharged to the room, circulates in a loop which is formed by the compressor 61→four-way valves 31 and 32→second outdoor heat exchanger 103→one-way valve 106→expansion valve 108→solenoid valve 50→second indoor heat exchanger 104→solenoid valve 45→four-way valve 31→solenoid valve 47→compressor 61, to thereby perform the cooling operation of the room.

As apparent from the foregoing, the air condition thus described employing one outdoor unit (compressor) connected to two indoor units can cool and heat two room spaces simultaneously according to the operating conditions set up by the user.

If would have been obvious to one of ordinary skill in the art to cut off the cooling cycle for a certain room of the simultaneous cooling or simultaneous heating rooms to thereby perform the individual cooling and individual heating.

Although embodiments of the present invention have disclosed cases where the passage is controlled in order to have the refrigerant to circulate along the full line arrows when the four-way valves 31, 32, 33 and 34 are deactivated, while the passage is controlled in order to have the refrigerant to circulate along the dotted line arrows when the four-way valves are activated, the present invention is not intended to be so limited.

In particular, it should be noted that the passage can be controlled so as to have the refrigerant to circulate along the dotted line arrows when the four-way valves 31, 32, 33 and 34 are deactivates while the passage can be controlled to have the refrigerant to circulate along the full line arrows when the four-way valves are activated.

Furthermore, although the embodiment of the present invention has been described with reference to one example where the passage of the refrigerant circulation is opened when the solenoid valves 41 through 50 are deactivated while the passage is closed when the solenoid valves are activated, the present invention is not intended to be so limited, and it should be apparent that the purpose and effect of the present invention can be also accomplished by change of the electric power sources of the solenoid valves 41 through 50 where the passage of the refrigerant circulation is cut off when the solenoid valves 41 through 50 are deactivated while the passage is opened when the solenoid valves are activated.

Although the present invention has been disclosed with reference to the embodiment where one outdoor unit (compressor) is connected to two indoor units, to thereby perform simultaneous cooling, simultaneous heating and separate but simultaneous cooling and heating of two room spaces, the present invention and the drawings are not to be taken as limiting, and it should be noted that according to the present invention, one outdoor unit (compressor) can be connected to more than two indoor units, to thereby control a plurality of room spaces simultaneously, or to individually cool or heat respective room spaces.

As is apparent from the above description, the control apparatus of an air conditioner and a method thereof according to the present invention can simultaneously cool and heat, and separately but simultaneously cool and heat a plurality of room spaces, employing one outdoor unit (compressor) connected with a plurality of indoor units, and at the same time, can individually cool or heat the plurality of room spaces.

Having described specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Apparatus for controlling the temperatures of a plurality of rooms, comprising:

a compressor for compressing refrigerant;

outdoor heat exchangers;

indoor heat exchangers disposed in respective rooms; refrigerant-conducting conduits inter-connecting the compressor, the outdoor heat exchangers, and the indoor heat exchangers;

automatically actuable valves for opening and closing selected ones of the conduits to define:

a first conducting passage arrangement wherein an outlet of the compressor communicates with all of the outdoor heat exchangers, and each of the outdoor heat exchangers communicating with a respective one of the indoor heat exchangers for supplying cold refrigerant thereto, a second conducting passage arrangement wherein the outlet of the compressor communicates with all of the indoor heat exchangers for supplying hot refrigerant thereto, and each of the indoor heat exchangers communicating with a respective one of the outdoor heat exchangers, and a third conducting passage arrangement wherein the outlet of the compressor communicates with one of the outdoor heat exchangers, and with one of the indoor heat exchangers for supplying hot refrigerant thereto, the one indoor heat exchanger communicating with another of the outdoor heat exchangers, and the one outdoor heat exchanger communicating with another of the indoor heat exchangers for supplying cold refrigerant thereto;

temperature sensors for sensing respective temperatures of the rooms; and a controller connected to the valves and including manual manipulable input elements enabling a user to select temperatures for respective rooms, and to select one of the first, second, and third conducting passage arrangements.

2. The apparatus according to claim 1 wherein the valves are electric solenoid valves.

3. A method of controlling the temperatures of a plurality of rooms by a refrigeration cycle including a compressor for compressing a refrigerant; outdoor heat exchangers, indoor heat exchangers disposed in respective rooms; refrigerant-conducting conduits interconnecting the compressor, the outdoor heat exchangers, and the indoor heat exchangers; and automatically actuable valves for opening and closing selected ones of the conduits; the method comprising the steps of:

A) manually manipulating a controller to select temperatures for respective rooms, and one operating mode from the group comprising:
 1) cooling of all the plurality of rooms,
 2) heating of all of the plurality of rooms, or
 3) heating of at least one room and cooling of at least one room;

B) sensing respective temperatures of the plurality of rooms;

C) comparing the sensed temperatures with respective selected temperatures for determining whether differences exist therebetween;

D) operating the valves to communicate an outlet of the compressor with all of the outdoor heat exchangers, and to communicate each of the outdoor heat exchangers with a respective one of the indoor heat exchangers when the operating mode of step A1 is selected;

E) operating the valves to communicate the outlet of the compressor with all of the indoor heat exchanges and to communicate each of the indoor heat exchangers within a respective one of the outdoor heat exchangers, when the operating mode of step A2 is selected; and F) operating the valves to communicate the outlet of the compressor with one of the outdoor heat exchangers, and with one of the indoor heat exchangers communicating the one indoor heat exchanger with another of the outdoor heat exchangers, and communicating the one outdoor heat exchanger with another of the indoor heat exchangers, when the operating mode A3 is selected.

4. The method according to claim 3 wherein each of steps D, E and F further includes operating the compressor at an operating frequency whose magnitude is a function of the magnitude of the largest temperature difference determined in step C.

* * * * *